(12) United States Patent
Roy

(10) Patent No.: US 9,995,195 B2
(45) Date of Patent: Jun. 12, 2018

(54) EMISSIONS CONTROL SYSTEMS AND METHODS FOR VEHICLES

(71) Applicant: Tecogen Inc., Waltham, MA (US)

(72) Inventor: Jean Roy, Middleton, MA (US)

(73) Assignee: Tecogen Inc., Waltham, MA (US)

(*) Notice: Subject to any disclaimer, the term of this patent is extended or adjusted under 35 U.S.C. 154(b) by 0 days. days.

(21) Appl. No.: 15/090,032

(22) Filed: Apr. 4, 2016

(65) Prior Publication Data
US 2017/0284266 A1   Oct. 5, 2017

(51) Int. Cl.
| | |
|---|---|
| F01N 3/00 | (2006.01) |
| F01N 3/30 | (2006.01) |
| F01N 13/00 | (2010.01) |
| F01N 9/00 | (2006.01) |
| F01N 11/00 | (2006.01) |
| F01N 3/10 | (2006.01) |

(52) U.S. Cl.
CPC ............ *F01N 3/30* (2013.01); *F01N 9/00* (2013.01); *F01N 11/002* (2013.01); *F01N 13/008* (2013.01); *F01N 13/009* (2014.06); *F01N 13/0093* (2014.06); *F01N 3/101* (2013.01); *F01N 2550/02* (2013.01); *F01N 2560/025* (2013.01); *F01N 2560/06* (2013.01); *F01N 2900/1404* (2013.01); *Y02A 50/2324* (2018.01); *Y02T 10/22* (2013.01)

(58) Field of Classification Search
USPC ......... 60/274, 289, 290, 291, 292, 293, 295, 60/298, 299, 300
See application file for complete search history.

(56) References Cited

U.S. PATENT DOCUMENTS

| | | | |
|---|---|---|---|
| 3,896,616 A | 7/1975 | Keith et al. | |
| 4,134,262 A | 1/1979 | Sugihara et al. | |
| 5,235,956 A * | 8/1993 | Yoshizaki | F01N 3/22 123/585 |
| 5,979,157 A * | 11/1999 | Kinugasa | F01N 3/0238 60/274 |
| 6,122,910 A * | 9/2000 | Hoshi | F01N 3/0835 60/285 |
| 6,722,125 B1 | 4/2004 | Pfalzgraf | |
| 8,683,786 B2 * | 4/2014 | Ruona | F01N 3/023 60/286 |
| 2006/0283179 A1* | 12/2006 | Oi | F01N 3/32 60/289 |
| 2015/0292383 A1 | 10/2015 | Devarakonda | |

OTHER PUBLICATIONS

US International Searching Authority, "International Search Report—App. No. PCT/US2016/025864", dated Jun. 24, 2016, WIPO.

* cited by examiner

*Primary Examiner* — Binh Q Tran
(74) *Attorney, Agent, or Firm* — Intrinsic Law Corp.

(57) ABSTRACT

Systems and methods of reducing the emissions of vehicles having a spark ignited internal combustion engine are provided. When the exhaust temperature is less than a set point temperature, the oxygen concentration of the exhaust is increased as the exhaust passes from a first stage catalytic converter to a second stage catalytic converter. The increased oxygen content of the exhaust improves the removal efficiency of carbon monoxide and/or hydrocarbons at the second stage catalytic converter without (or with minimal) reforming nitrogen oxide compounds. The oxygen concentration of the exhaust is not increased when the exhaust temperature is greater than the set point temperature.

20 Claims, 10 Drawing Sheets

EMISSIONS CONTROL SYSTEMS AND METHODS FOR VEHICLES

TECHNICAL FIELD

The present application relates generally to emissions control systems for vehicles.

BACKGROUND

Vehicle emissions are highly regulated to keep the output of environmentally-harmful exhaust emissions to a minimum. If vehicle exhaust is left untreated, the levels of pollutants would far exceed the emissions standards set by the Environmental Protection Agency and the states. The major regulated pollutants include carbon monoxide (CO), nitrogen oxide compounds (NOx), and unburned hydrocarbons (CxHy).

To meet these standards, vehicles include exhaust treatment systems, which generally include two stages of catalytic converters. An example of such an exhaust treatment system is illustrated in FIG. 1, which is a block diagram of an underbody of a vehicle 10 according to the prior art. The vehicle 10 includes engine 100, first catalytic converter 110, second catalytic converter 120, and muffler 130, which are in fluid communication with one another through pipe or conduit 140. In operation, the engine 100 generates exhaust, which travels through conduit 140 to first catalytic converter 110, second catalytic converter 120, muffler 130, and then exits through tail pipe 150. The first catalytic converter 110, known in the industry as the "light off" catalytic converter, is disposed close to engine 100 to treat exhaust emissions while engine 100 is cold (e.g., below 600° F.), such as during a cold start of engine 100. The second catalytic converter 120, known in the industry as the "underbody" catalytic converter, is disposed further away from engine 100 underneath the passenger compartment of the vehicle 10. The second catalytic converter 120 typically does not meaningfully contribute to exhaust treatment until the engine 100 heats up (e.g., above 650° F.), which typically occurs when the engine 100 becomes loaded.

A problem with existing emissions control systems is that the emissions output of carbon monoxide (CO) and hydrocarbons (CxHy), e.g. from partially-combusted fuel, is high when the exhaust temperature is low, such as while the engine warms up from a cold start. It would be desirable to have an emissions control system that more effectively treats CO and CxHy compounds while the engine and exhaust heat up from a cold start.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

In an aspect, the invention is directed an apparatus. The apparatus includes a first catalytic converter including a three-way catalyst, the first catalytic converter receiving an exhaust generated by a rich burn spark-ignited internal combustion engine in a vehicle. The apparatus also includes a second catalytic converter in fluid communication with the first catalytic converter. The apparatus also includes a conduit extending from the first catalytic converter to the second catalytic converter. The apparatus also includes an air injector in fluid communication with the conduit. The apparatus also includes a controller in electrical communication with the air injector, wherein the air injector injects air into the conduit when a temperature of the exhaust is lower than a temperature set point.

In another aspect, the invention is directed to an apparatus. The apparatus includes a first catalytic converter including a three-way catalyst, the first catalytic converter receiving an exhaust generated by a rich burn spark-ignited internal combustion engine in a vehicle. The apparatus also includes a second catalytic converter in fluid communication with the first catalytic converter. The apparatus also includes a conduit extending from the first catalytic converter to the second catalytic converter. The apparatus also includes a valve coupled to the conduit. The apparatus also includes a controller in electrical communication with the valve, wherein the valve opens to allow air into the conduit when a temperature of the exhaust is lower than a temperature set point.

In another aspect, the invention is directed to a method of reducing emissions from a vehicle. The method includes generating exhaust from a spark-ignited internal combustion engine in the vehicle, the engine operating with a rich-burn air-fuel ratio (AFR). The method also includes passing the exhaust through a first catalytic converter that includes a first three-way catalyst, the first catalytic converter reducing a concentration of nitrogen oxide (NOx) compounds, carbon monoxide (CO) and hydrocarbons (CxHy) in the exhaust. The method also includes passing the exhaust through a second catalytic converter that includes a second three way catalyst, the second catalytic converter reducing a second concentration of carbon monoxide (CO) and hydrocarbons (CxHy) in the exhaust, the second catalytic converter disposed downstream of the first catalytic converter. The method also includes with an air injector or a valve, adding air to the exhaust, as the exhaust passes through a conduit extending from the first catalytic converter to the second catalytic converter, when an exhaust temperature is less than a set point temperature. The method also includes stopping the air addition when the exhaust temperature is greater than the set point temperature.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

During warm up of a vehicle from a cold start, air or oxygen is introduced to the exhaust stream until the exhaust temperature reaches a set point temperature. The air or oxygen is introduced between a first stage catalytic converter and a second stage catalytic converter. As a result of the increase in oxygen concentration of the exhaust, the oxidation reactions that occur in the second stage catalytic converter can be more effective when the exhaust temperature is less than the set point temperature. For example, the increased oxygen concentration of the exhaust can enhance the removal efficiency of carbon monoxide and/or non- or partially-combusted hydrocarbons from the exhaust stream.

When the exhaust temperature reaches the set point temperature, the air or oxygen source is turned off to prevent the reformation of nitrogen oxide compounds, which can occur at temperatures above the set point temperature but does not occur (or only minimally occurs) at temperatures below the set point temperature.

Figure 1:
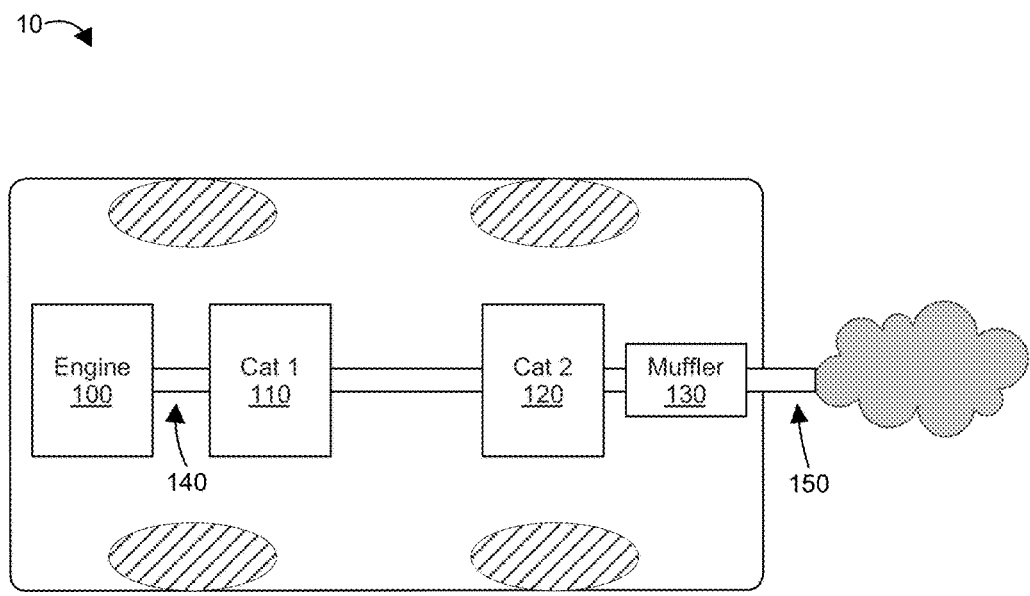
FIG. 1 is a block diagram of an underbody of a vehicle according to the prior art.
Figure 2:
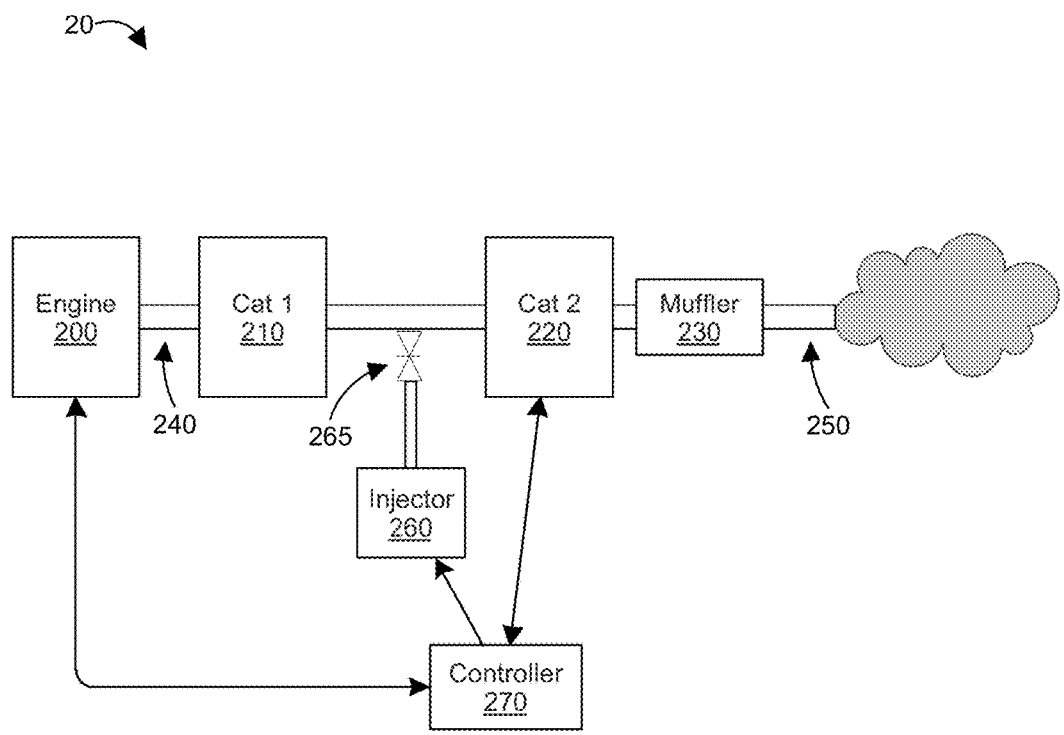
FIG. 2 is a block diagram of an emissions control system according to one or more embodiments.

FIG. 2 is a block diagram of an emissions control system 20 according to one or more embodiments. The emissions control system 20 can be incorporated in a vehicle, such as vehicle 10 discussed above. The emissions control system 20 includes a first catalytic converter 210, a second catalytic converter 220, a muffler 230, an air injector 260, and a controller 270. The first and second catalytic converters 210, 220 can include a catalyst comprising one or more platinum group metals (PGMs), such as Pt, Pd, and/or Rh. In some embodiments, one or both of first and second catalytic converters 210, 220 include a three-way catalyst (TWC) as known in the art.

In operation, engine 200 is started by a driver. The engine 200 can operate with an air-fuel ratio (AFR) in the rich burn regime (i.e., less than or equal to a stoichiometric AFR). In some embodiments, the stoichiometric AFR is 14.64:1 (by mass) for gasoline. The stoichiometric AFR can vary depending on the type of fuel. For example, the stoichiometric AFR can be lower if the fuel includes ethanol. As an example, E85 fuel (85% ethanol, 15% gasoline) can have a stoichiometric AFR of about 9.8:1. When the engine operates in the rich burn regime, the exhaust contains a minimal or a substantially zero oxygen content. For example, the oxygen content can be less than or equal to about 0.1%, less than or equal to about 0.05%, and/or less than or equal to about 0.025% by volume.

If the engine 200 has not been running recently, the engine 200 and the emissions control system 20 begin at a cold start where their temperatures are at or near ambient temperature. For example, the ambient temperature can be between 0° F. and 90° F. depending on the geographic location of the vehicle and the time of year. When the engine 200 starts, it generates an exhaust stream that is directed through conduit 240, which directs the exhaust through first catalytic converter 210, second catalytic converter 220, muffler 230, and tail pipe 250.

A microprocessor-based controller 270 receives a signal from engine 200 indicating that the engine 200 is started. After receipt of the signal, controller 270 determines the temperature of second catalytic converter 220. For example, controller 270 can send a signal to a thermocouple or other temperature-sensitive device disposed within or proximal to second catalytic converter 220. In response to the signal, the thermocouple sends a signal representing the current temperature measured by the thermocouple, which can correspond to the current temperature of second catalytic converter 220. Alternatively, the thermocouple can automatically send a signal representing the current temperature, for example on a periodic basis (e.g., every 5 seconds) or a non-periodic basis.

The controller 270 receives the signal from the thermocouple and determines the measured temperature. The controller then compares the measured temperature with a temperature set point stored in a memory of the controller. The temperature set point can be in the range of about 400° F. to about 650° F., including about 425° F., about 450° F., about 475° F., about 500° F., about 525° F., about 550° F., about 575° F., about 600° F., and about 625° F., or any range between any two of the foregoing values. As used herein, "about" means plus or minus 10% of the relevant value.

If the measured temperature is lower than the temperature set point, the controller 270 sends a control signal to air injector 260, which requests air injector 260 to inject air into conduit 240 between first and second catalytic converters 210, 220. The control signal can also provide details regarding the setting of air injector 260, such as a requested air flow output. If the measured temperature is higher than the temperature set point, the controller 270 sends a stop signal requesting air injector 260 to stop injecting air into conduit 240. If air injector 260 was not previously injecting air, air injector 260 does not perform any action in response to the stop signal. In some embodiments, air injector 260 sends an acknowledgment message to controller 270 after receiving the command/request from controller 270.

On a periodic or non-periodic basis, the controller 270 re-checks the temperature measured by the thermocouple and then compares the new temperature measurement with the temperature set point. If the new temperature is still lower than the temperature set point, the controller 270 continues to send signals to air injector 260 to request air injector 260 to inject air into conduit 240. In some embodiments, the controller can request the air injector 260 to inject a smaller or greater volume of air into conduit 240 as a function of the measured temperature and/or the difference between the measured temperature and the temperature set point.

In addition or in the alternative to the above, one or more thermocouples or similar devices can be disposed in or proximal to engine 200, in or proximal to first catalytic converter 210, in or proximal to conduit 240, and/or in or proximal to muffler 230. Any or all of these thermocouples can be in communication with controller 270, which can use them as a proxy for a temperature measurement of second catalytic converter 220.

The addition of air (particularly oxygen) to the exhaust downstream of first catalytic converter 210 and upstream of second catalytic converter 220 while the temperature of second catalytic converter 200 is less than the temperature set point improves the removal efficiency of second catalytic converter 220 for CO and CxHy compounds without reforming NOx compounds (or with only minimal NOx reformation). However, adding air upstream of second catalytic converter 220 when the temperature of second catalytic converter 200 is greater than the temperature set point causes reforming of NOx compounds, which is undesirable and may result in noncompliance with emissions control standards. Additional details of a multi-stage emissions control system that achieves a similar benefit using inter-stage cooling and air injection are disclosed in U.S. Pat. No. 8,578,704, entitled "Assembly and Method for Reducing Nitrogen Oxides, Carbon Monoxide and Hydrocarbons in Exhausts of Internal Combustion Engines," to the present Applicant, which is incorporated herein by reference.

In some embodiments, an oxygen sensor is disposed in conduit 240 downstream of air injector 260. The oxygen sensor can measure the oxygen content of the exhaust after air is injected into conduit 240, which controller 270 can use as feedback. For example, controller 270 can compare the measured oxygen content with a minimum and a maximum oxygen content. For example, the minimum oxygen content can from about 0.5% to about 1.0% or about 0.75% by volume. The maximum oxygen content can be from about 1.0% to about 2.0% or about 1.5% by volume.

In response to the feedback, controller 270 can modulate the volume of air injected by air injector 260, such as by turning the air injector off and on rapidly so the air injector 260 has an effective duty cycle. Alternatively, controller 270 can modulate the power or output of air injector 260.

In some embodiments, a valve 265 can be coupled to conduit 240 and air injector 260. For example, valve 265, such as a throttle valve, can be adjusted, e.g. in response to a signal from controller 270, to control the volume of air entering conduit 240 from air injector 260. Alternatively, valve 265 can be a solenoid valve that can be adjusted, e.g. in response to a signal from controller 270, to allow air to enter conduit 240 and to stop air from entering conduit 240, for example to provide an effective duty cycle.

In an alternative embodiment, air injector 260 is removed and the valve 265 allows ambient air to enter conduit 240 between first and second catalytic converters 210, 220. The valve 265 can be a throttle valve or a solenoid valve, as discussed above. The valve 265 can be in electrical communication with controller 270. Those skilled in the art will recognize that other types of valves can be incorporated in the system.

In some embodiments, a cooling apparatus can be disposed between the first and second catalytic converters 210, 220. The cooling apparatus can be configured to regulate the exhaust temperature so it stays lower than the set point temperature for as long as possible. When the exhaust temperature is lower than the set point temperature, the emissions control system can more efficiently reduce CO and/or CxHy emissions in some embodiments. The cooling apparatus can include a heat exchanger, cooling coils, a water injector, a cooling vaporizer, and/or a thermoelectric generator (TEG), which can produce electricity in conjunction with cooling the exhaust gases. The TEG can operate independently of the exhaust temperature, for example to generate energy to power one or more components of the vehicle (e.g., stereo, heated seats, etc.) and/or to store energy in a battery. An example of a TEG incorporated in a vehicle can be found in U.S. patent application Ser. No. 14/947,726, filed on Nov. 20, 2015, entitled "Systems and Methods for Reducing Emissions in Exhaust of Vehicles and Producing Electricity," which is incorporated herein by reference. The '726 application is assigned to the same assignee as the present application.

Figure 3:
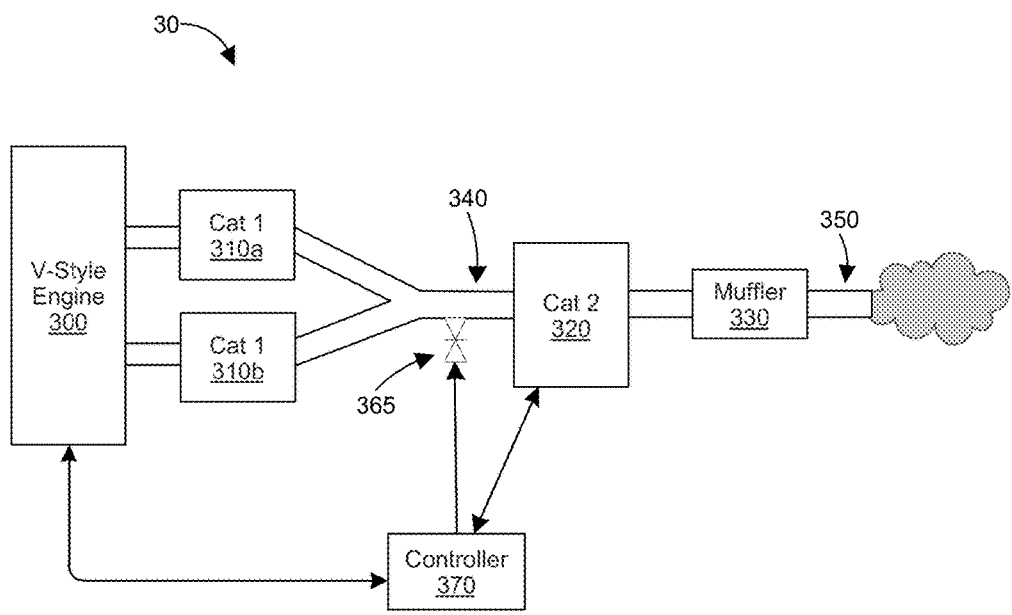
FIG. 3 is a block diagram of an emissions control system according to one or more embodiments.
Figure 4:
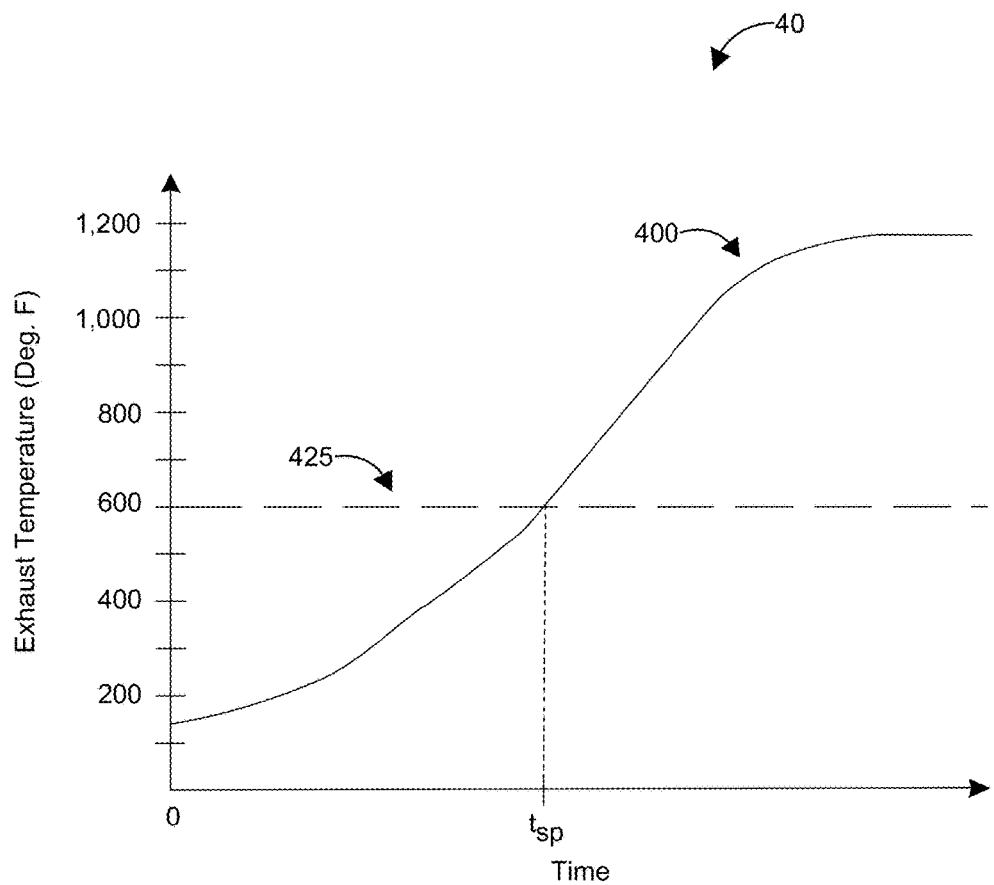
FIG. 4 is a graph illustrating the exhaust temperature of an exemplary vehicle engine.

FIG. 3 is a block diagram of an emissions control system 30 according to one or more embodiments. The emissions control system 30 can be incorporated in a vehicle, such as vehicle 10 discussed above. The emissions control system 30 includes first catalytic converters 310a, 310b (in general, first catalytic converter 310), a second catalytic converter 320, a muffler 330, a valve 365, and a controller 370. The foregoing components of emissions control system 30 can be the same or substantially the same as the components described above with respect to emissions control system 20.

As illustrated in FIG. 3, engine 300 is a V-style engine. As with engine 200, V-style engine 300 can operate with an AFR in the rich burn regime. In general, the exhaust systems for this type of engine include at least two parallel "light off" catalytic converters 310 proximal to engine 300. Although not illustrated, emissions control system 30 can include additional first catalytic converters 310. First catalytic converters 310 can be in fluid communication with a corresponding number of cylinders in engine 300. For example, if engine 300 has 4 cylinders, first catalytic converters 310a, 310b can each be in fluid communication (and receive the exhaust from) 2 cylinders. Similarly, for a 6-cylinder engine, first catalytic converters 310a, 310b can each be in fluid communication with 3 cylinders. Alternatively, an additional first catalytic converter 310c (not illustrated) can be included so each catalytic converter 310a, 310b, 310c is in fluid communication with 2 cylinders. Various other configuration are possible, such as one catalytic converter 310a being in fluid communication with 3 cylinders while the other catalytic converter 310b is in fluid communication with 1 cylinder. Alternatively, the first catalytic converters 310 can be connected via a manifold that is in fluid communication with engine 300 and the manifold distributes the exhaust to the first catalytic converters 310.

The output conduit or pipe for each first catalytic converter 310a, 310b merges into a second conduit or pipe 340. Second conduit 340 extends through second catalytic converter 320 and muffler 330 to tail pipe 350. Valve 365 is disposed on second conduit 340 between first catalytic converters 310a, 310b and second catalytic converter 320. Alternatively, valve 365 can be disposed on the outlet conduit for first catalytic converter 310a and/or 310b. Valve 365 can be a solenoid valve, a throttle valve, a butterfly valve, or other type of valve. In operation, controller 370 sends a control signal to valve 365 for valve 365 to open or close. In some embodiments, the control signal can designate how far valve 365 opens or closes, such as with a throttle or butterfly valve.

As discussed above, controller 370 is configured to let air into conduit 340 to increase the oxygen content of the exhaust when the temperature of second catalytic converter 320 (or other temperature measurement indicative of the temperature of second catalytic converter 320, as discussed above) is below a threshold value. The controller 370 can determine the temperature of second catalytic converter 320 using one or more thermocouples disposed in second catalytic converter 320, conduit 340, or other location in emissions control system 30, as discussed above. One or more oxygen sensors can be disposed in conduit 340 between valve 365 and second catalytic converter 320 to measure the oxygen concentration of the exhaust/air mixture. Controller 370 can use the information from the oxygen sensor(s) as feedback to control valve 365.

In some embodiments, valve 365 is coupled to an air injector, an air pump, a blower, a fan, or other device to force or direct air through valve 365 into conduit 340. Controller 370 can send control signals to the air injector/blower/fan/ etc. in addition to the control signals to valve 365.

When the engine (e.g., engine 200 or 300) is started at a cold start at time 0, the engine generates exhaust at a low temperature, such as about 100° F. to about 200° F., because the engine starts from approximately ambient temperature. Ambient temperature can vary depending on the time of year and time of day, for example from below freezing to about 100° F. or more. For purposes of graph 40, the exhaust at cold start is 150° F. After the engine runs for a while (with or without a load), its exhaust reaches a steady state temperature of about 1,200° F.

As discussed above, air or oxygen is introduced to the exhaust stream between first and second catalytic converter stages when the exhaust temperature is less than a set point temperature, for example in the range of about 400° F. to about 650° F. For purposes of graph 40, the set point 425 is 600° F. In other words, air or oxygen is added to the exhaust stream between first and second catalytic converter stages from time 0 to $t_{sp}$, the time corresponding to the exhaust reaching the set point temperature 425.

Figure 5A:
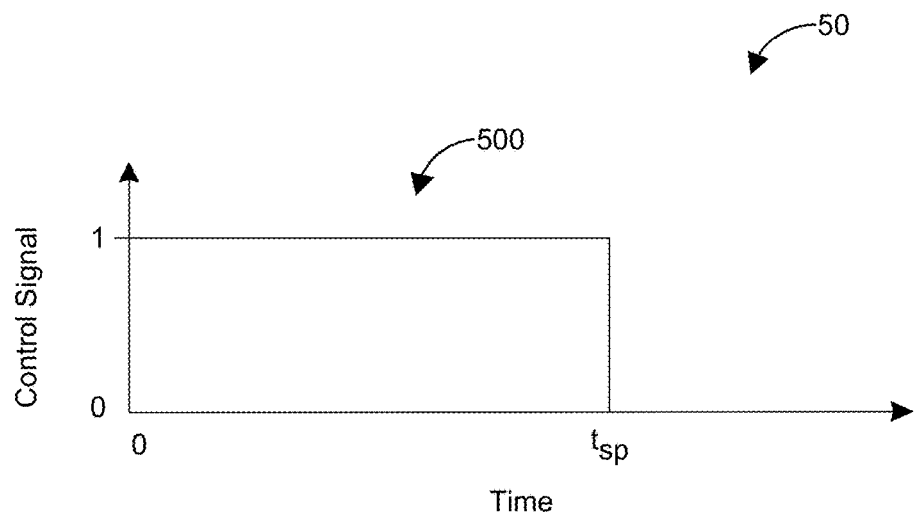
FIG. 5A is a graph illustrating a digital control signal output by a micro-processor based controller according to one or more embodiments.

FIG. 5A is a graph 50 illustrating a digital control signal 500 output by a micro-processor based controller for injector 260 or valve 365 described above according to one or more embodiments. As shown in graph 50, the control signal is set to 1 at cold start (time 0) until $t_{sp}$ when exhaust reaches the set point temperature 425. After $t_{sp}$, the control signal is set to 0. When the injector 260 or valve 365 receives a control signal corresponding to a digital 1, the injector 260/valve 365 allows air to enter into the conduit between first and second catalytic converter stages either by injecting air or by opening the valve, respectively. When the injector 260 or valve 365 receives a control signal corresponding to a digital 0, the injector 260/valve 365 stops air from entering into the conduit.

Figure 5B:
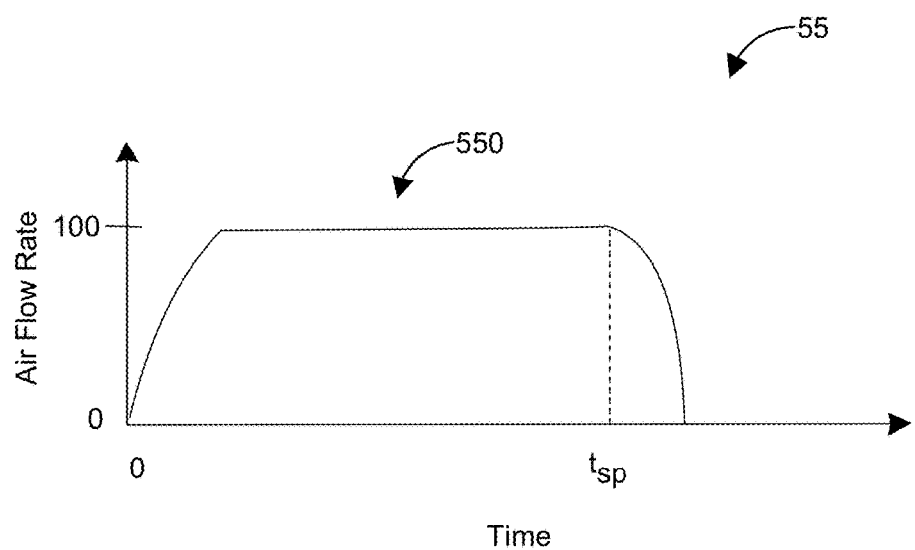
FIG. 5B is a graph illustrating the flow rate of air or oxygen entering the conduit or pipe between first and second catalytic converters, the flow rate corresponding to the control signals illustrated in FIG. 5A.

FIG. 5B is a graph 55 illustrating the flow rate 550 of air or oxygen entering the conduit or pipe between first and second catalytic converters, the flow rate corresponding to the control signals illustrated in FIG. 5A. As shown in graph 55, the flow rate 550 increases from 0 to a steady state flow rate until $t_{sp}$ when the flow rate decreases.

Figure 6A:
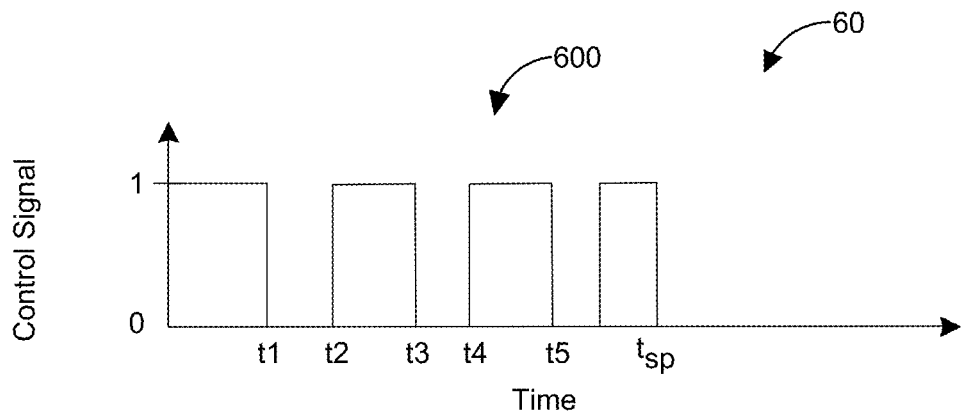
FIG. 6A is a graph illustrating a digital control signal output by a micro-processor based controller according to one or more alternative embodiments.

FIG. 6A is a graph 60 illustrating a digital control signal 600 output by a micro-processor based controller for injector 260 or valve 365 described above according to one or more alternative embodiments. As shown in graph 60, the control signal is set to 1 at cold start until t1 at which point the control signal is set to 0. As discussed above, the controller can stop air flow if the oxygen content is greater than a predetermined concentration per volume (e.g., about 5% to about 10%), for example to improve engine efficiency. When the oxygen content falls below the predetermined concentration at t2, the controller returns the control signal to 1. This process continues until the exhaust is warmed to the set point temperature 425 at $t_{sp}$.

Figure 6B:
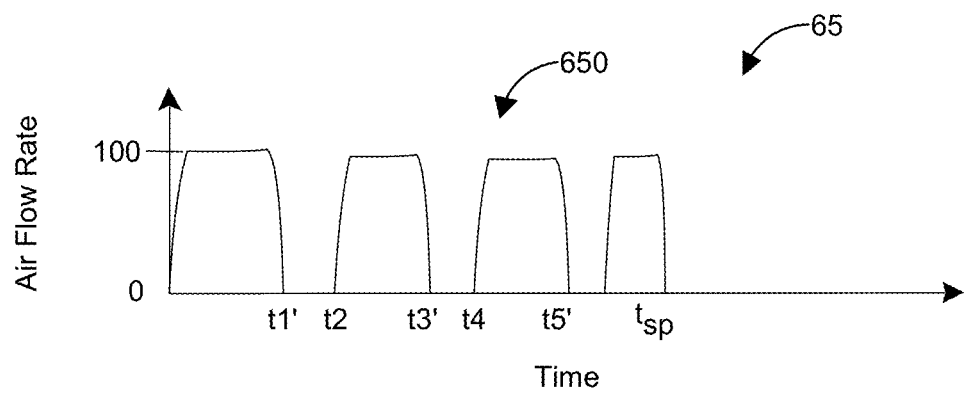
FIG. 6B is a graph illustrating the air or oxygen flow rates that correspond to the digital control signals illustrated in FIG. 6A.

FIG. 6B is a graph 65 illustrating the air or oxygen flow rates 650 that correspond to the value of digital control signal 600. As shown in graph 65, the flow rate 650 increases from 0 to a steady state flow rate until t1 when the flow rate decreases. The flow rate stops at t1' shortly after t1 due to lag time in closing the valve or stopping the air injector. This process continues until $t_{sp}$.

Figure 7:
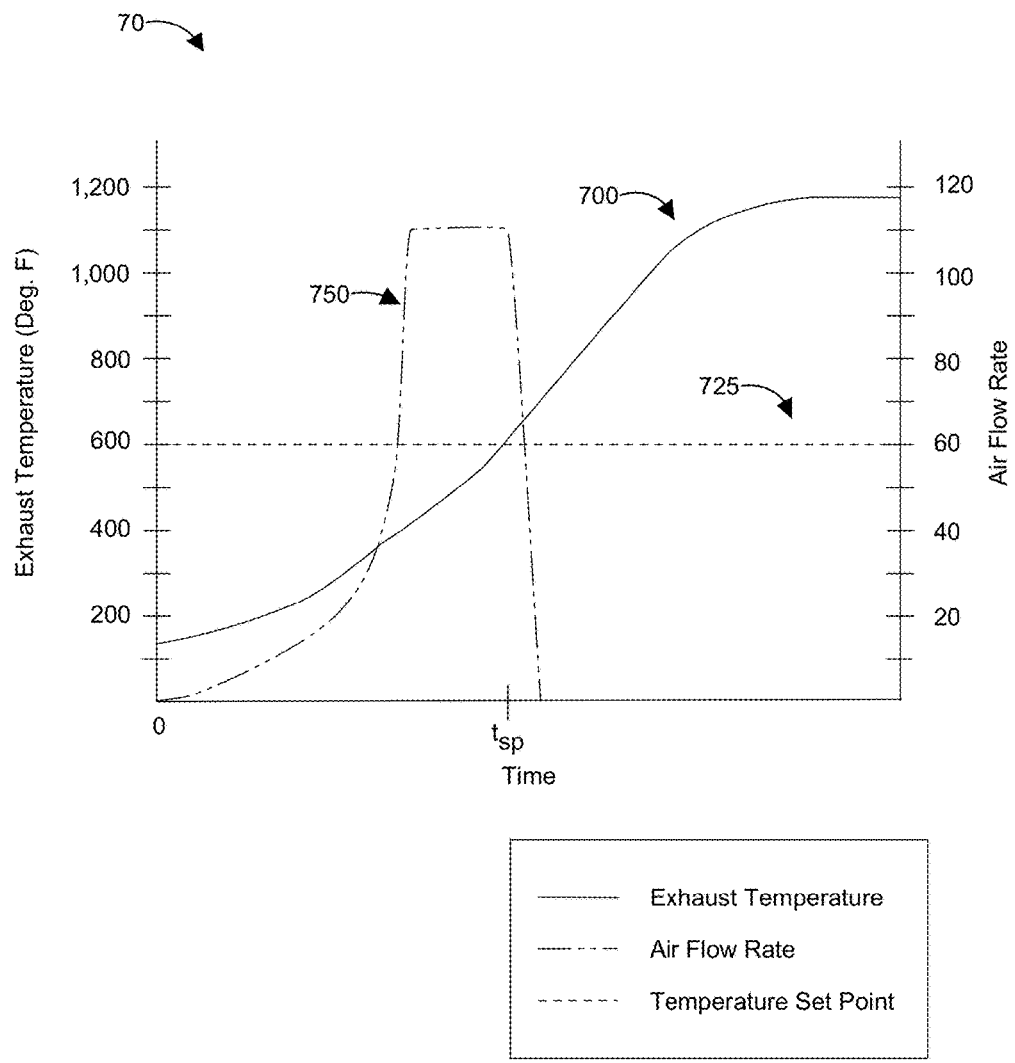
FIG. 7 is a graph that illustrates exhaust temperature and air flow rate according to one or more embodiments.

FIG. 7 is a graph 70 that illustrates exhaust temperature and air flow rate according to one or more embodiments. As illustrated, exhaust temperature 700 increases in time from a cold start (e.g., a temperature of about 150° F.) at time 0 to a steady state temperature of about 1,200° F. The exhaust temperature 700 reaches the set point temperature 725 of 600° F. at $t_{sp}$. Graph 70 also illustrates air flow rate 750 as a function of exhaust temperature. As shown in FIG. 7, the air flow rate 750 is low (less than 10 units such as CFMs) when the exhaust temperature 700 is less than 100° F. The air flow rate 750 increases linearly, from 10 units to 20 units, with exhaust temperature 700 in the range of 100° F. to 200° F. After the exhaust temperature 700 reaches 200° F., the air flow rate 750 increases quickly to a maximum flow rate of 110 units when exhaust temperature 700 is in the range of 300° F. to 600° F. When the exhaust temperature 700 reaches the set point temperature 725 of 600° F. at $t_{sp}$, the air flow rate 750 decreases rapidly to 0 as the valve, air injector, or other device is closed or shut off at $t_{sp}$.

As discussed above, the set point temperature 725 can be other values such as about 400° F. to about 650° F., about 450° F. to about 600° F., about 500° F. to about 500° F., or about 550° F. to about 600° F. Of course, different air flow rate profiles can be used, such as a linear increase in flow rate as a function of time until the set point temperature. Those skilled in the art will recognize that additional flow rate profiles are possible and within the scope of this disclosure. For example, the air flow rate can be set at a maximum value (e.g., 110 units) at time 0 and remain at that flow rate until the exhaust temperature 700 reaches the set point temperature 725 of 600° F. at $t_{sp}$.

Figure 8:
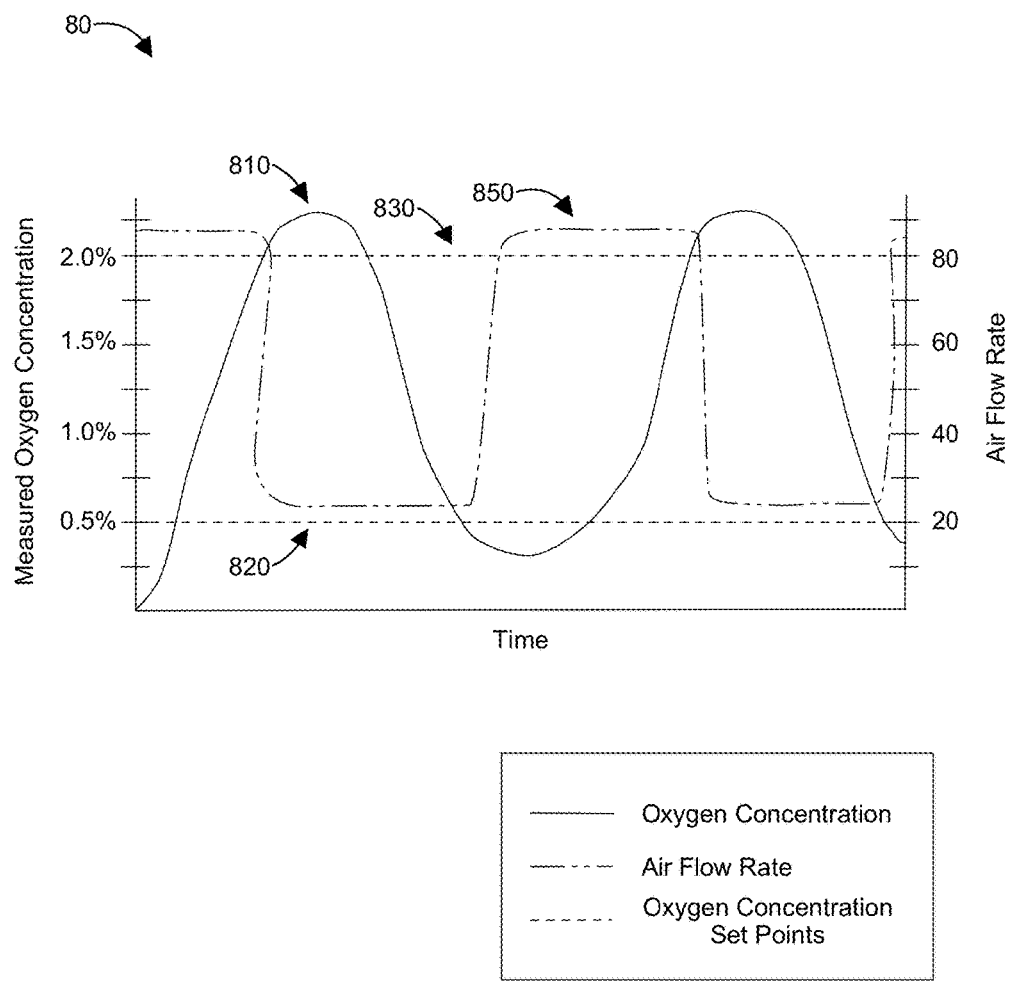
FIG. 8 is a graph that illustrates measured oxygen concentration and air flow rate according to one or more embodiments.

FIG. 8 is a graph 80 that illustrates measured oxygen concentration 810 and air flow rate 850 according to one or more embodiments. The measured oxygen concentration 810 represents the oxygen concentration (by volume) of the exhaust downstream of the valve, air flow injector, or other device that introduces air into the exhaust stream between the first and second stage catalytic converters. An oxygen sensor or other device can measure the oxygen concentration of the exhaust. A controller receives signals from the oxygen sensor that represent (e.g., as a voltage) the oxygen concentration measurements of the exhaust. When the measured oxygen concentration 810 of the exhaust is below a threshold oxygen concentration 820 (e.g., 0.5% by volume), the controller opens the valve (or turns on the air flow injector, etc.) to introduce air into the exhaust stream. When the valve opens, the air flow rate 850 increases quickly to a high flow rate (e.g., 90 units such as CFMs), which causes the oxygen concentration 810 to increase. The valve stays open (or the air flow injector remains on, etc.) until the measured oxygen concentration 810 reaches a maximum oxygen concentration set point 830 (e.g., 2.0% by volume) when the controller closes the valve (or turns off or turns down the air flow injector, etc.) at least partially to reduce the volume of air (e.g., to a flow rate of about 20 units such as CFMs) entering the exhaust stream. The valve stays at least partially closed (or the air flow injector remains at a lower setting, etc.) until the measured oxygen concentration 810 falls below the threshold oxygen concentration 820. This cycle can repeat until the exhaust temperature exceeds the set point temperature, as discussed above, at which point air is no longer introduced. The cycle can re-start when the exhaust temperature falls below the set point temperature.

Figure 9:
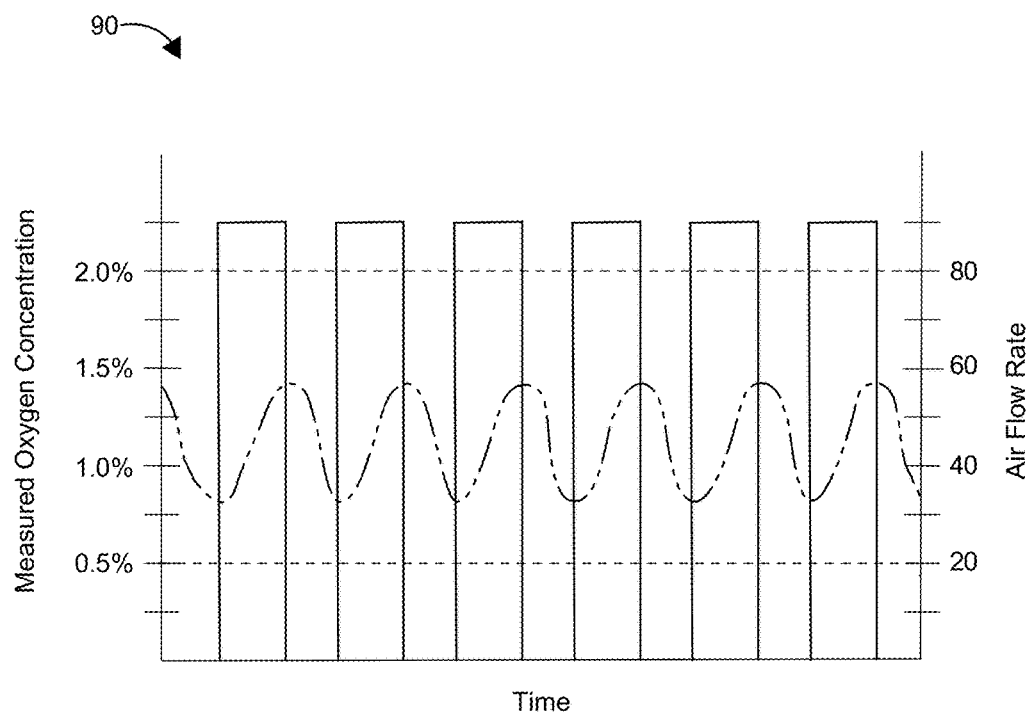
FIG. 9 is a graph that illustrates measured oxygen concentration and air flow rate according to one or more embodiments.

FIG. 9 is a graph 90 that illustrates measured oxygen concentration 910 and air flow rate 950 according to one or more embodiments. In contrast to graph 80, graph 90 illustrates that the air flow rate 950 is turned on and off rapidly such as by a solenoid valve. The rapid on and off of the flow rate can be considered an effective duty cycle of about 50%. As a result of the rapid fluctuation in air flow rate 950, the oxygen concentration 910 appears like a sine wave centered at 1.0%. The rapid fluctuation in air flow rate 950 can decrease the variability of the oxygen concentration 910, for example as compared to graph 80.

Figure 10:
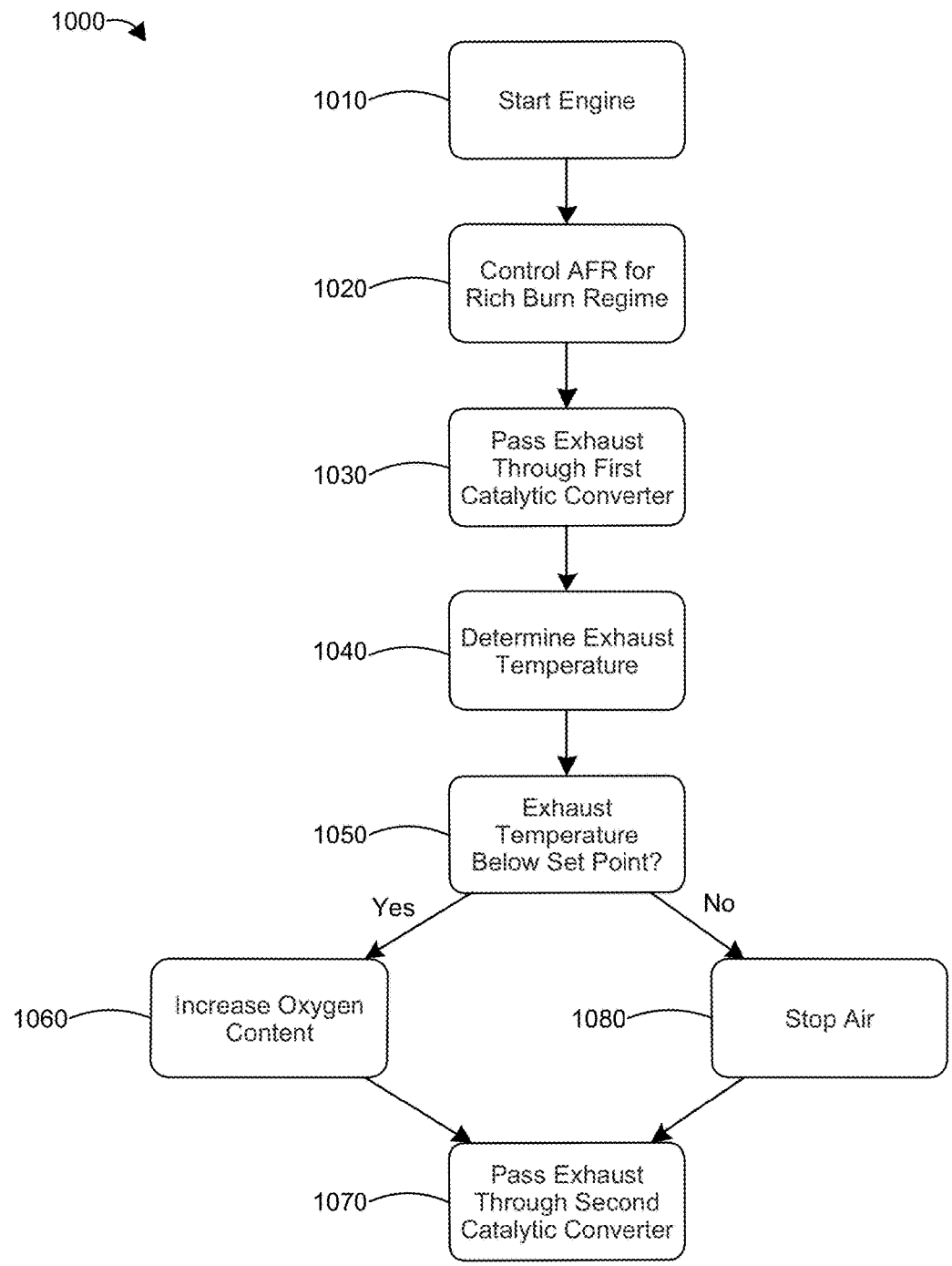
FIG. 10 is a flow chart illustrating a method for reducing emissions in a vehicle according to one or more embodiments.

FIG. 10 is a flow chart 1000 illustrating a method for reducing emissions in a vehicle according to one or more embodiments. The method includes starting 1010 the engine of a vehicle that includes a spark-ignited internal combustion engine such as a gasoline engine. The method also includes controlling 1020 the AFR so the engine operates in the rich-burn regime. In general, a rich-burn engine operates with an AFR that is less than or equal to a stoichiometric AFR needed for complete combustion of fuel. In some embodiments, the stoichiometric AFR is 14.64:1 (by mass) for gasoline. Thus, a rich-burn engine can have an AFR of 14.64:1 or less, such as about 14:1, about 13.5:1, about 13:1 or any value or range between any two of the foregoing values. As discussed above, the stoichiometric AFR is lower for gasoline-ethanol blends such as E85. When the engine operates in the rich burn regime, the exhaust contains a minimal or a substantially zero oxygen content. For example, the oxygen content of the exhaust by volume can be less than or equal to about 0.1%, less than or equal to about 0.05%, and/or less than or equal to about 0.025%. In some embodiments, the engine operates for at least a portion of the time (e.g., during idle) in the lean burn regime (i.e., with an AFR greater than the stoichiometric AFR such as about 15:1). The AFR can be controlled using an oxygen sensor, an engine control unit (ECU), and/or an air-fuel ratio meter as known in the art.

In act 1030, exhaust from the rich-burning engine passes through a pipe or conduit to a first stage catalytic converter, which can include a three-way catalyst. The first stage catalytic converter can remove some or substantially all of NOx, CO, and CxHy compounds in the exhaust through oxidation-reduction reactions to form CO2, H2O, N2, and O2. In some embodiments, two or more first stage catalytic converters are arranged in parallel where each catalytic converter receives a portion of the exhaust generated by the engine.

In act 1040, a microprocessor-based controller determines the temperature of the exhaust. The temperature can be determined with a thermocouple or similar device disposed in the vehicle emissions control system. For example, the thermocouple can be disposed at near the outlet of the engine, in the conduit between the engine and the first stage catalytic converter, at or near the first stage catalytic converter(s), or in the conduit between the first and second stage catalytic converters. In some embodiments, more than one thermocouple can be disposed in the vehicle emissions control system and the controller takes an average reading of the thermocouples. The thermocouple is in electrical communication with the controller and outputs a signal (e.g., a voltage) representing the temperature measured by the thermocouple. The controller converts the signal from the thermocouple to a temperature measurement.

In act 1050, the controller compares the measured temperature with a set point temperature stored in a memory in communication with the microprocessor. The set point temperature can be about about 400° F. to about 650° F., about 450° F. to about 600° F., about 500° F. to about 500° F., or about 550° F. to about 600° F., or any value or range between any two of the foregoing values.

If the measured temperature is less than the set point temperature, the controller sends a control signal to increase 1060 the oxygen content of the exhaust before it passes through the second stage catalytic converter. The control signal can be sent to a valve on a conduit or pipe that extends between the first and second catalytic converters. For example, the control signal can cause a solenoid valve to open, which allows air to pass into the conduit/pipe. In another example, the control signal can cause an actuator to open a throttle or butterfly valve to a fully-open position or a partially-open position. The position of the throttle or butterfly valve can be based at least in part on the measured temperature, the exhaust flow rate, and/or the pressure exerted by the exhaust in the conduit/pipe. In another example, the control signal can cause an air injector, an air pump, a blower, a fan, or other device to force or direct air into the conduit/pipe between the first and second stage catalytic converters. A valve can be disposed between the air injector or other device and the conduit/pipe. The setting of the air injector or other device, as discussed above, can be based at least in part on the measured temperature, the exhaust flow rate, and/or the pressure exerted by the exhaust in the conduit/pipe. The air injector or other device can have a single speed or setting or a variable speed or setting. For example, in a single speed or setting air injector, the air injector can only be turned on or off. In a variable speed or multi-setting air injector, the air injector can be set to provide different flow rates of air.

In some embodiments, an oxygen sensor is disposed downstream of the valve or air injector inlet in the conduit/pipe between the first and second stage catalytic converters. The oxygen sensor can measure the oxygen content of the exhaust after the addition of air to the exhaust stream. The controller can use the measured oxygen content as feedback to adjust the amount of air added to the exhaust. For example, the controller can keep the oxygen concentration within a predetermined range, such as between 0.5% and 2.0% by volume.

After the oxygen content of the exhaust has been increased, the method proceeds to act 1070 where the oxygenated exhaust is passed through the second stage catalytic converter. The second stage catalytic converter can include a TWC or three-way catalyst as discussed above. The second stage catalytic converter can remove some or substantially all of carbon monoxide (CO) and non-combusted hydrocarbons (CxHy) in the exhaust through an oxidation reaction to form carbon dioxide and water. In some embodiments, two or more second stage catalytic converters are arranged in parallel where each catalytic converter receives a portion of the oxygenated exhaust. Since the temperature of the exhaust is lower than the set point temperature (e.g., less than about 400° F.), the addition of oxygen to the exhaust can improve the oxidation reaction of CO and CxHy and result in reduced CO and CxHy emissions without (or with minimal) reforming NOx compounds, as discussed above.

If the measured temperature is greater than the set point temperature, the controller sends a control signal to stop 1080 increasing the oxygen content of the exhaust. The control signal can cause the valve to close and/or the air injector or other device stop. However, if no air is being added to the exhaust, for example because the previous exhaust temperature measurement was also greater than the set point temperature, the controller does not need to take any action since the valve is already closed and/or the air injector or other device is already stopped. Alternatively, the controller sends the control signal even if the previous exhaust temperature measurement was also greater than the set point temperature.

After the oxygen or air flow is stopped (or if no action needs to occur because the previous exhaust temperature measurement was greater than the set point temperature), the exhaust passes 1070 through the second stage catalytic converter, as discussed above. At temperatures above the set point temperature, the second stage catalytic converter can efficiently remove CO and CxHy compounds without an increased oxygen concentration. If oxygen were added to the exhaust when the exhaust temperature is greater than the set point temperature, the second stage catalytic converter could cause an increase in the concentration of NOx compounds, which could cause the vehicle to fail to comply with emissions standards.

Thus it can be seen from the above that the addition of oxygen (through air or other oxygen source) to vehicle exhaust as it passes between the first and second stage catalytic converters when the exhaust temperature is lower than a set point temperature can improve the removal of carbon monoxide and/or unburned hydrocarbons at the second stage catalytic converter without (or with minimal) reforming polluting nitrogen oxide compounds.

What is claimed is:

1. An apparatus comprising:
   a first catalytic converter including a three-way catalyst, the first catalytic converter receiving an exhaust generated by a rich burn spark-ignited internal combustion engine in a vehicle;
   a second catalytic converter in fluid communication with the first catalytic converter;
   a conduit extending from the first catalytic converter to the second catalytic converter;
   an air injector in fluid communication with the conduit; and
   a controller in electrical communication with the air injector, wherein the air injector injects air into the conduit when a temperature of the exhaust is lower than a temperature set point.

2. The apparatus of claim 1, wherein the temperature set point is 400° F. to 650° F.

3. The apparatus of claim 2, wherein the temperature set point is 550° F. to 600° F.

4. The apparatus of claim 1, further comprising a thermocouple disposed in the conduit, the thermocouple in electrical communication with the controller.

5. The apparatus of claim 1, further comprising an oxygen sensor disposed in the conduit between an inlet port of the air injector and the second catalytic converter, the oxygen sensor in electrical communication with the controller.

6. The apparatus of claim 1, wherein the controller sends a signal to stop the air injector when the temperature of the exhaust is greater than the temperature set point.

7. An apparatus comprising:
   a first catalytic converter including a three way catalyst, the first catalytic converter receiving an exhaust generated by a rich burn spark-ignited internal combustion engine in a vehicle;
   a second catalytic converter in fluid communication with the first catalytic converter;
   a conduit extending from the first catalytic converter to the second catalytic converter;
   a valve coupled to the conduit; and
   a controller in electrical communication with the valve, wherein the valve opens to allow air into the conduit when a temperature of the exhaust is lower than a temperature set point.

8. The apparatus of claim 7, wherein the temperature set point is 400° F. to 650° F.

9. The apparatus of claim 8, wherein the temperature set point is 550° F. to 600° F.

10. The apparatus of claim 7, further comprising a thermocouple disposed in the conduit, the thermocouple in electrical communication with the controller.

11. The apparatus of claim 7, further comprising an oxygen sensor disposed in the conduit between the valve and the second catalytic converter, the oxygen sensor in electrical communication with the controller.

12. The apparatus of claim 7, wherein the controller sends a signal to close the valve when the temperature of the exhaust is greater than the temperature set point.

13. The apparatus of claim 7, wherein the valve is a solenoid valve.

14. The apparatus of claim 7, wherein the valve is a throttle valve.

15. A method of reducing emissions from a vehicle, the method comprising:
   generating exhaust from a spark-ignited internal combustion engine in the vehicle, the engine operating with a rich-burn air-fuel ratio (AFR);
   passing the exhaust through a first catalytic converter that includes a first three way catalyst, the first catalytic converter reducing a first concentration of nitrogen oxide (NOx), carbon monoxide (CO), and hydrocarbons (CxHy) compounds in the exhaust;
   passing the exhaust through a second catalytic converter that includes a second three way catalyst, the second catalytic converter reducing a second concentration of CO and CxHy in the exhaust, the second catalytic converter disposed downstream of the first catalytic converter;
   with an air injector or a valve, adding air to the exhaust, as the exhaust passes through a conduit extending from the first catalytic converter to the second catalytic converter, when an exhaust temperature is less than a set point temperature; and
   stopping the air addition when the exhaust temperature is greater than the set point temperature.

16. The method of claim 15, further comprising measuring a temperature of the exhaust with a thermocouple disposed between the first and second catalytic converters.

17. The method of claim 15, further comprising measuring an oxygen content of the exhaust with an oxygen sensor disposed downstream of the air injector and upstream of the second catalytic converter.

18. The method of claim 15, wherein the set point temperature is 400° F. to 650° F.

19. The method of claim 18, wherein the set point temperature is 550° F. to 600° F.

20. The method of claim 15, further comprising repeating the addition of air when the exhaust temperature falls below the set point temperature.

* * * * *